May 6, 1958
G. E. ALBERT
2,833,388
TOY TYPEWRITER
Filed Sept. 30, 1955
2 Sheets-Sheet 1
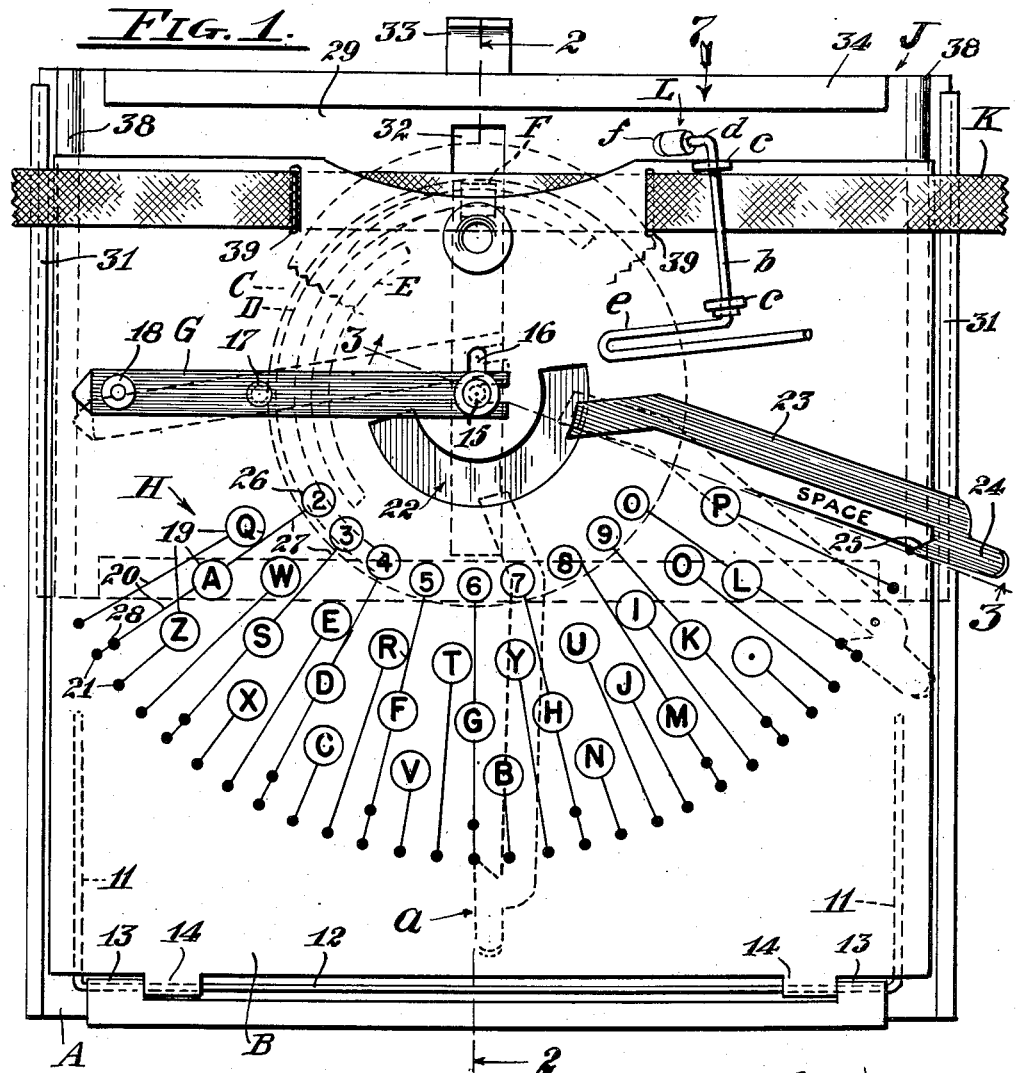
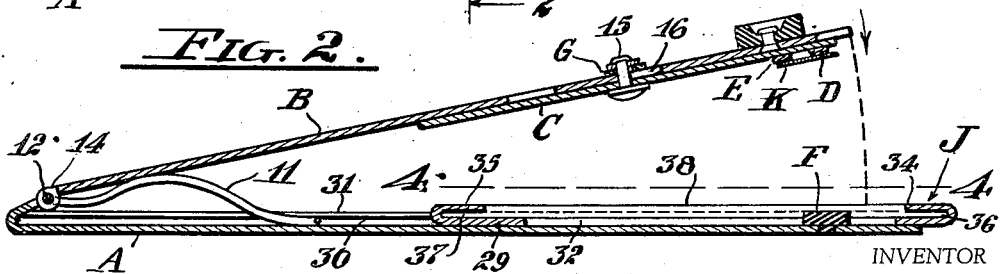
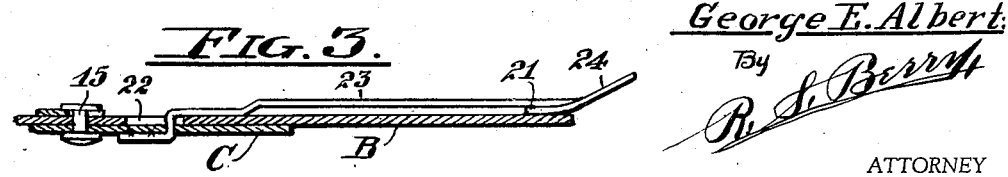
INVENTOR
George E. Albert
By R. S. Berry
ATTORNEY

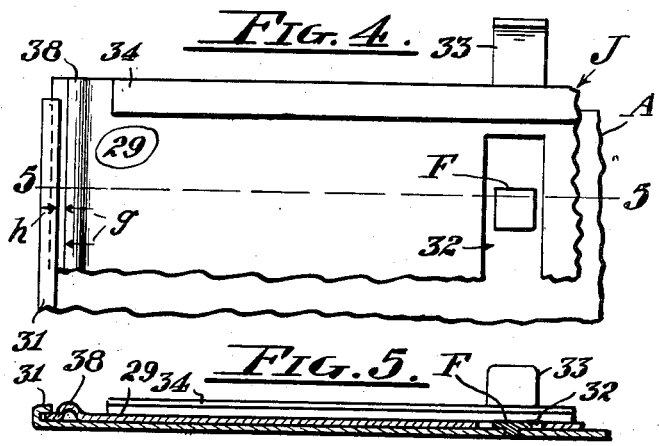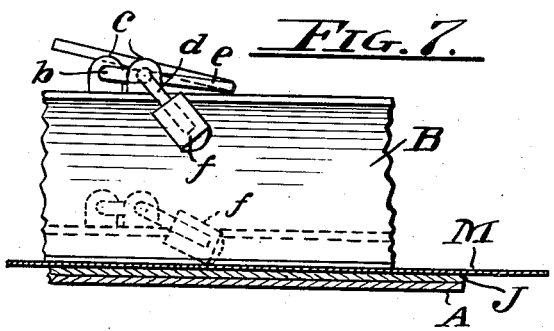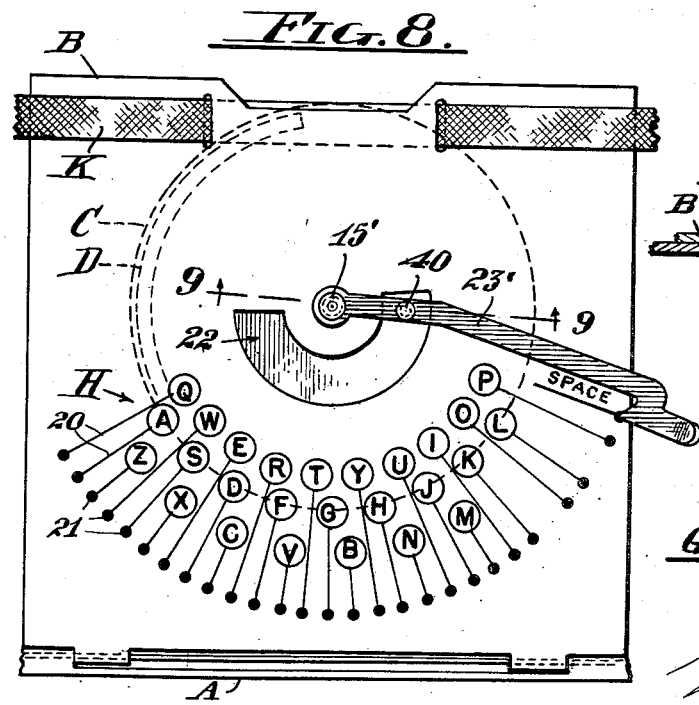

United States Patent Office 2,833,388
Patented May 6, 1958

2,833,388

TOY TYPEWRITER

George E. Albert, Los Angeles, Calif.

Application September 30, 1955, Serial No. 537,757

8 Claims. (Cl. 197—47)

This invention relates to a toy typewriter and has as its primary object the provision of a printing device which is particularly designed for educational and pastime purposes especially by children who are learning to spell and to formulate sentences.

The invention contemplates generally the use of a movable type bar embodying the alphabet together with manually operable selective means for disposing a particular letter in a printing position, and a movable mounting therefor whereby the selected letter may be imprinted on a sheet of paper.

A particular object of the invention is to provide a simple mode of mounting the printing indicia, selecting the desired indicia, and effecting the printing operation.

Another object is to provide a type selective means including an arrangement of indicia corresponding to the keyboard of a conventional typewriter so as to facilitate operation of the printing mechanism by individuals familiar with the typewriter keyboard, and also serve as a means of teaching the uninformed the relative positions of the various letters of such keyboard.

A further object is to provide a simple and effective means for automatically feeding a strip or sheet of paper step-by-step on effecting successive printing operations to present successive aligned areas thereof to a printing position.

With the foregoing objects in view together with such other objects and advantages as may subsequently appear, the invention resides in the parts and in the combination, construction and arrangement of parts hereinafter described and claimed, and as illustrated by way of example in the accompanying drawings in which:

Fig. 1 is a plan view of the typewriter showing it as equipped for printing letters of the alphabet and numerals:

Fig. 2 is a sectional view taken on the line 2—2 of Fig. 1 as seen in the direction indicated by the arrows:

Fig. 3 is a detail in section and elevation as seen on the line 3—3 of Fig. 1:

Fig. 4 is a fragmentary plan view taken on the line 4—4 of Fig. 2:

Fig. 5 is a detail in section taken on the line 5—5 of Fig. 4:

Fig. 6 is an inverted plan view of a fragmentary portion of the printing disk showing it as equipped with a type bar of letters and with a type bar of numerals:

Fig. 7 is a detail in section and elevation as seen in the direction of the arrow 7 in Fig. 1 showing the sheet advancing mechanism and depicting its mode of operation:

Fig. 8 is a plan view of a modified form of the type selective and printing mechanism wherein the numerals are omitted: and Fig. 9 is a detail in section taken on the line 9—9 of Fig. 8.

Referring to the drawings more specifically A indicates a rectangular base plate on one margin of which is hingedly mounted a panel B for vertical swinging movement relative to the plate A. The panel B substantially conforms to the plate A and is normally disposed in an upwardly inclined relation to and slightly spaced from the plate A by a pair of bow springs 11 here shown as formed on the ends of a wire 12 utilized as a pintle in hingedly mounting the panel B on the plate A. The wire 12 is passed through pairs of aligned sleeves 13 and 14 formed on the contiguous margins of the plate A and panel B to provide the requisite hinged mounting for the latter.

In carrying out the invention there is mounted on the underside of the panel B a turnable flat circular disk C which slidably abuts the under side of the panel B and is axially pivotally supported on the latter by a pivot pin 15. Formed on the under side of the disk C adjacent the margin thereof is an arcuate type bar D extending concentric with the axis of the pivot 15, the type bar carrying a series of individual type elements comprising the letters of the alphabet as particularly shown in Fig. 3. In the form of the invention shown in Fig. 1 a second arcuate type bar E is provided bearing a series of individual type elements comprising the digits 2, 3, 4, 5, 6, 7, 8, 9 and 0, in their order from right to left as shown in Fig. 3, which type bar E parallels and is slightly spaced inwardly relative to the type bar D.

Mounted on the plate A in underlying relation to the outermost marginal portion of the disk C is a small block F of resilient material constituting a platen. The disk C is arranged so that on depression of the panel B one of the type elements on the type bar D will overlie the platen F and in the construction shown in Figs. 1 and 2 the pivotal mounting 15 of the disk C is shiftable outwardly in a slot 16 formed in the panel B so as to dispose one of the digits of the type bar E to overlie the mid-center of the platen F which constitutes a printing position. In order to minimize or insure against smearing of paper during a printing operation hereinafter described, the platen is formed with its top surface having an area slightly larger than that of a single type element and whereby the imprinting of only a single type element on each operation will be insured. As a means for shifting the disk C to dispose the type bars D and E in an out of the printing position, a lever G is pivoted at 17 on the outer face of the panel B one end of which is forked and extends astride the pivot 15. The other end of the lever G is fitted with a fingerhold 18 by which it may be manipulated to move the pivot pin 15 with the disk C thereon along the length of the slot 16.

The outer end of the lever G is inturned and frictionally bears on the outer face of the panel B under a tension imparted to the outer end portion of the lever.

The upper face of the panel B bears a chart H comprising a series of parallel arcuate rows of indicia 19 constituting the letters of the alphabet arranged complementary to the lettered keys of the conventional typewriter. The arcuate rows of letters are concentric with the axis of the pivot 15 when the latter is in its innermost position and the several letters are arranged on spaced apart lead lines 20 extending in radial relation to the pivot 15, which lines terminate in dots 21 arranged in an arcuate row concentric with the arcuate rows of indicia 19.

The panel B is formed adjacent the pivot 15 with an arcuate slot 22 through which extends the inner end portion of a lever-arm 23 which is fixedly engaged with the disk C as particularly shown in Fig. 3. The lever-arm 23 overlies the upper face of the panel B and has a fingerhold 24 on its outer end by which it may be grasped and swung laterally across the upper face of the panel B to effect turning of the disk C. The outer end portion of the lever-arm is formed with a pointer 25' arranged to denote the dots 21. The lever-arm 23 bears on the plate A under tension imparted to the lever-arm and whereby the latter will be held against free movement over the plate A.

The alphabetical indicia on the type bar D are arranged in co-relation with the alphabetical indicia 19 and their associated lead lines 20 with each particular letter on the type bar disposed to occupy the printing position over the platen F when the lever-arm 23 is positioned with its pointer 25 indicating the dot 21 on the line 20 designating such particular letter on the chart H. For example, on swinging the lever-arm 23 to dispose the pointer 25 thereon on the dot 21 on the line 20 leading to the letter "G," as indicated in dotted lines a in Fig. 1, the disk C will be positioned to dispose the "G" indicia on the type bar D opposite the platen F.

The chart H in the construction shown in Fig. 1 also embodies an arcuate row of numerals 26 arranged between the uppermost row of the letters 19 and the slot 22, which row of numerals is concentric with the axis of the pivot 15 when the latter is in its uppermost position in the slot 16. Radial lines 27 extend from the indicia 26 to dots 28 disposed in a row concentric with the row of indicia 26 and upwardly spaced from the row of dots 21. On moving the disk C to its uppermost position the pointer 25 on the lever-arm 23 will be positioned to traverse the row of dots 28. The numerical indicia 26 is arranged to co-relate with the numerical type on the type bar E so that when the pointer 25 is disposed to indicate a dot 28, the type number complementary to the indicated indicia 26 will be disposed in the printing position opposite the platen F.

Means are provided for feeding and guiding a strip or sheet of paper over the platen F which means embodies a sheet receiving guideway J slidably mounted on the base plate A for rectilinear movement toward and away from the hinged mounting of the panel B. The guideway J comprises a rectangular plate 29 of sheet material the ends of which are slidably engaged in opposed channels 30 formed by inturned flanges 31 on the side margins of the base plate A. The plate 29 is formed with an elongated slot 32 to accommodate the platen F and is fitted with a handle 33 by which it may be advanced and retracted.

Inturned flanges 34—35 are provided on the longitudinal margins of the plate 29 to form open ended opposed channels 36—37 adapted to slidably receive the margins of a paper sheet and to afford a guideway therefor. The end portions of the plate 29 are formed with upstanding rounded ribs 38—38 interposed between the flanges 31 on the base plate A and the ends of the flanges 34—35 and spaced from the latter, whereby the ends of a paper sheet being advanced longitudinally of the plate 29 may be directed over the marginal flanges 31.

As a means for effecting the imprint on the paper sheet of type carried on the disk C, an inked ribbon K is extended beneath the type in contact therewith. The ribbon K is disposed parallel with and adjacent to the outer margin of the panel B and with an intermediate portion thereof underlying the panel B and extending over the underside of the disk C, while end portions of the ribbon lead through parallel slots 39—39 in the panel B and overlie the top face of the latter as particularly shown in Fig. 1. By this arrangement on depression of the panel B with a paper sheet imposed over the platen F, the type element disposed in the printing position will press the inked ribbon against the sheet and thereby imprint a character on the sheet.

Means are provided for automatically advancing the paper sheet with a step-by-step movement on successive printing operations, so that on each depression of the panel B the sheet will be moved to present a succeeding clear area to the approaching type. This means is here shown as consisting of a prod L carried on the outer marginal portion of the panel B which prod consists of a rock shaft b mounted on upstanding lugs c on the panel B, the shaft b overlying the panel B in diagonal relation thereto and having a downturned outer end portion d which projects at an inclination to the vertical both laterally and inwardly with its terminus disposed for engagement with the paper sheet. As a means for maintaining the outer end portion d in its inclined position, the inner end of the rock-shaft b is formed with a laterally extending landing portion e projecting in the general direction of the portion d into contact with the panel B to limit turning of the rock-shaft b in one direction and normally dispose the end portions d at its requisite inclination.

The end portion d is preferably equipped with a resilient tip f adapted to frictionally engage the paper sheet M when brought into contact therewith as shown in dotted lines in Fig. 7. The tip f may be adjusted lengthwise of the portion d to vary its moment of contact with the sheet M and thereby vary the length of the stroke of the prod.

The invention contemplates the elimination of the numeral type bar E and the associated numerical indicia 26 on the chart H, which also involves elimination of the shiftable mounting of the disk C. In this instance the construction shown in Figs. 8 and 9 is employed wherein the printing disk C is carried on a fixed pivot 15' to which is connected the lever arm 23' and which is attached to the disk C through the slot 22 by a pivot 40; whereby the disk C may be turned to a selected position by manipulation of the lever arm 23'.

In the operation of the invention, the panel B is normally disposed in spaced upwardly inclined relation to the base plate A under the urge of the springs 11 as shown in Fig. 2. When it is desired to effect a printing operation, a paper sheet M is mounted on the guideway J with its margins loosely and slidably engaged in the channels 36—37 and with a desired portion thereof overlying the platen F, the guideway J being adjusted in its guides 30 to dispose the sheet in desired alignment with the platen according to the line of type to be imprinted thereon. To facilitate this and subsequent positioning of the sheet one of the side margins of the guideway J is provided with spacing lines g arranged to register with an indicator h on the adjacent flange 31.

The printing disk C is then actuated by means of the lever-arm which is swung to a position indicating the character on the chart H desired to be printed thereby disposing the corresponding type element on the disk C in its printing position opposite the platen F.

The panel B is then depressed to cause the prod L to engage and effect advance of the sheet M to a printing position and then cause the type element to bear on the inked ribbon K and thereby form an imprint of the type element on the sheet M.

On release of the panel B it will return to its upper position in readiness for another operation with the prod L disposed in readiness to effect advance of the sheet M to a succeeding position. In this fashion a line of imprints may be formed on the sheet. When it is desired to print another line, the guideway J is pulled outwardly as by the handle 33 to the requisite position whereupon the printing of a succeeding line may be effected.

Where the device is equipped with the numerical type bar E a desired number may be printed by advancing the disk C by the lever G and then operating the disk C by the lever-arm as before described to dispose the selected numerical type element in its printing position.

While a specific embodiment of the invention has been shown and described, the invention is not limited to the exact details of construction set forth, and the invention embraces such changes, modifications and equivalents of the parts and their formation and arrangement as come within the purview of the appended claims.

I claim:

1. In a typewriter, a base plate, a panel mounted on and overlying said base plate for vertical swinging movement relative thereto, a stationary platen carried on and projecting upwardly from said plate, means for positioning on said platen a sheet to be printed, a flat disk pivoted on the underside of said panel, an arcuate type bar fixed on the under-side of said disk, said type bar embodying a series of type elements arranged to be individually disposed to overlie and be presented to said platen in a printing position on turning said disk, manually operable means for turning said disk, and means on said panel co-operable with said last named means to enable disposing selected of said type elements in their printing position opposite said platen; said platen being dimensioned to accommodate one only of said elements at a time.

2. In a typewriter, a base plate, a panel mounted on and overlying said base plate for vertical swinging movement relative thereto, a stationary platen carried on and projecting upwardly from said plate, means for positioning on said platen a sheet to be printed, a flat disk pivoted on the underside of said panel, an arcuate type bar fixed on the under-side of said disk, said type bar embodying a series of type elements arranged to be individually disposed to overlie and be presented to said platen in a printing position on turning said disk, a chart of characters on said panel complementary to said type elements, and a lever-arm directly fixed to said disk movable over said chart and co-operable with the characters thereof to enable disposing selected of said type elements in their printing position opposite said platen; said platen being dimensioned to accommodate one only of said elements at a time.

3. In a typewriter, a panel mounted for vertical swinging movement, a turnable disk carried on the underside of said panel, a type-bar on the underside of said disk embodying a series of type elements, a chart of characters on said panel complementary to said type elements, a lever-arm overlying said panel directly attached to said disk through a slot in said panel, said lever-arm being operable to designate individual of said characters, said type elements and characters being co-related so that when a particular character is designated by said lever arm the complementary type element will be disposed in a printing position, and means for positioning a sheet to be printed beneath said disk.

4. The structure called for in claim 3 together with means on said panel directly engageable with said sheet on downward movement of the panel and operable to advance said sheet.

5. The structure called for in claim 3 together with a base plate on which said panel is carried, a raised stationary platen on said plate on which the sheet to be printed lies, said platen being dimensioned to accommodate one only of said type elements at a time, and an inked ribbon carried by said panel positioned to underlie at least a portion of said type bar and to overlie the portion of said sheet overlying said platen.

6. In a typewriter embodying a base plate, a panel hinged thereon for vertical swinging movement, a stationary platen on said plate, type elements carried by said panel, and means for selectively positioning individual of said type elements in printing relation to said platen; a slide plate mounted on said base-plate, a guideway on said slide plate by means of which a sheet to be printed may be directed over said platen, and means mounted on said panel directly engaging and advancing a sheet in said guideway on each down stroke of said panel.

7. In a typewriter, a panel mounted for vertical swinging movement, a turnable disk carried on the underside of said panel, a type bar on the underside of said disk embodying a series of type elements, a chart of characters on said panel complementary to said type elements, a lever-arm overlying said panel directly attached to said disk through a slot in said panel, said lever-arm being operable to designate individual of said characters, said type elements and characters being co-related so that when a particular character is designated by said lever-arm the complementary type element will be disposed in a printing position, means for positioning a sheet to be printed beneath said disk, a base plate on which said panel is carried, a raised stationary platen on said plate on which the sheet to be printed lies, and an inked ribbon carried by said panel positioned to underlie at least a portion of said type bar and to overlie the portion of said sheet overlying said platen, said panel being formed with a pair of guide slots spaced apart on opposite sides of said platen through which said ribbon leads.

8. In a toy typewriter of the type embodying a base plate, a panel mounted on and overlying said base plate for vertical swinging movement relative thereto, a flat disk pivoted on the underside of said panel, an arcuate type bar fixed on the underside of said disk, said type bar embodying a series of fixed type elements, manually operable means for turning said disk, means on the outer face of said panel cooperable with said last named means to enable disposing selected of said type elements in a printing position, and means on said base plate for guiding a paper sheet thereover beneath said type bar; the improvement consisting of an upstanding platen on said base plate having an upper end positioned in line with said type bar and dimensioned to accommodate one only of said type elements and over which a sheet in said guiding means extends, and an inked ribbon slidably carried by said panel with a portion thereof underlying a portion of said type bar and disposed to overlie said platen and the portion of a sheet extending over the latter.

References Cited in the file of this patent

UNITED STATES PATENTS

| | | |
|---|---|---|
| 264,091 | Martin | Sept. 12, 1882 |
| 317,753 | Farmer | May 12, 1885 |
| 432,982 | Cohn | July 29, 1890 |
| 475,894 | Sanderson | May 31, 1892 |